United States Patent
Gerhardt et al.

(10) Patent No.: US 10,113,597 B2
(45) Date of Patent: *Oct. 30, 2018

(54) CASSETTE DRIVER FOR A FREEWHEEL HUB

(71) Applicant: Christianson Systems, Inc., Blomkest, MN (US)

(72) Inventors: Jim Gerhardt, St. Augusta, MN (US); Shannon Hansen, Bird Island, MN (US); Patrick Robert Jensen, South Haven, MN (US)

(73) Assignee: Christianson Systems, Inc., Blomkest, MN (US)

( * ) Notice: Subject to any disclaimer, the term of this patent is extended or adjusted under 35 U.S.C. 154(b) by 8 days.

This patent is subject to a terminal disclaimer.

(21) Appl. No.: 15/089,998

(22) Filed: Apr. 4, 2016

(65) Prior Publication Data
US 2017/0284481 A1    Oct. 5, 2017

(51) Int. Cl.
| | | |
|---|---|---|
| F16D 41/28 | (2006.01) | |
| B60B 27/02 | (2006.01) | |
| B60B 27/04 | (2006.01) | |

(52) U.S. Cl.
CPC .......... *F16D 41/28* (2013.01); *B60B 27/023* (2013.01); *B60B 27/047* (2013.01); *B60B 2320/10* (2013.01); *B60B 2360/104* (2013.01); *B60B 2900/111* (2013.01)

(58) Field of Classification Search
CPC ... F16D 41/28; B60B 27/023; B60B 2900/11; B60B 2360/10; B60B 2360/104
USPC ......... 301/110.5; 403/359.1, 359.6; 474/152, 474/902
See application file for complete search history.

(56) References Cited

U.S. PATENT DOCUMENTS

| | | | |
|---|---|---|---|
| 8,371,660 B2* | 2/2013 | Shook .................. | B60B 27/026 301/110.5 |
| 8,801,109 B2* | 8/2014 | Tho ...................... | B60B 27/0047 301/110.5 |
| 8,974,140 B2* | 3/2015 | Durling ................. | F16D 1/033 403/357 |
| 2009/0066152 A1* | 3/2009 | You ....................... | B60B 27/023 301/106 |

(Continued)

FOREIGN PATENT DOCUMENTS

| | | |
|---|---|---|
| EP | 2 907 673 A1 | 8/2015 |
| GB | 2513441 A | 10/2014 |

OTHER PUBLICATIONS

Great Britain Search Report for Application No. 1712030.4 dated Sep. 25, 2017.

*Primary Examiner* — S. Joseph Morano
*Assistant Examiner* — Jean W Charleston
(74) *Attorney, Agent, or Firm* — Merchant & Gould P.C.

(57) ABSTRACT

Forward movement of a bicycle results when force is transfer from the chain or belt to a sprocket on a cassette. The cassette is splined to the cassette driver and causes the wheel of the bike to rotate when torque is applied from the cassette to the cassette driver. The cassette driver is typically made of a strong hard material such as steel to withstand the forces in parted thereon by the cassette. The present disclosure provide a hub configuration and method that enables the cassette driver to be made with construction of a lighter weight material such as aluminum yet still withstand the toque applied thereto.

19 Claims, 17 Drawing Sheets

(56) References Cited

U.S. PATENT DOCUMENTS

2014/0015308 A1\* 1/2014 Chen ................... B60B 27/023
                                                301/110.5

\* cited by examiner

CASSETTE DRIVER FOR A FREEWHEEL HUB

TECHNICAL FIELD

A cassette driver for a freewheel hub.

BACKGROUND

Freewheeling bicycle hubs are generally known. For example, U.S. Pat. No. 2,211,548 to Frank W. Schwinn issued on Jun. 24, 1940 is directed to a freewheeling bicycle hub configuration. Freewheeling bicycle hubs are configured to enable rotation of the pedals to drive the rotation of the wheels while also allowing the wheels to rotate independently of the rotation of the pedals. This functionality enables the pedals of the bike to be held stationary while the wheels rotate as the bike coasts. Often freewheeling hubs are configured for geared applications that include a rear cassette. A cassette driver is a portion of the hub that supports a cassette and drives the rotation of the cassette.

SUMMARY

Forward movement of a bicycle results when force is transferred from the chain or belt to a sprocket on a cassette. The cassette is splined to the cassette driver and causes the wheel of the bike to rotate when torque is applied from the cassette to the cassette driver. The cassette driver is typically made of a strong hard material such as steel to withstand the forces imparted thereon by the cassette. The present disclosure provides a hub configuration and method that enables the cassette driver to be constructed of a lighter weight material such as aluminum yet still withstand the torque applied thereto.

DETAILED DESCRIPTION

Figure 1:
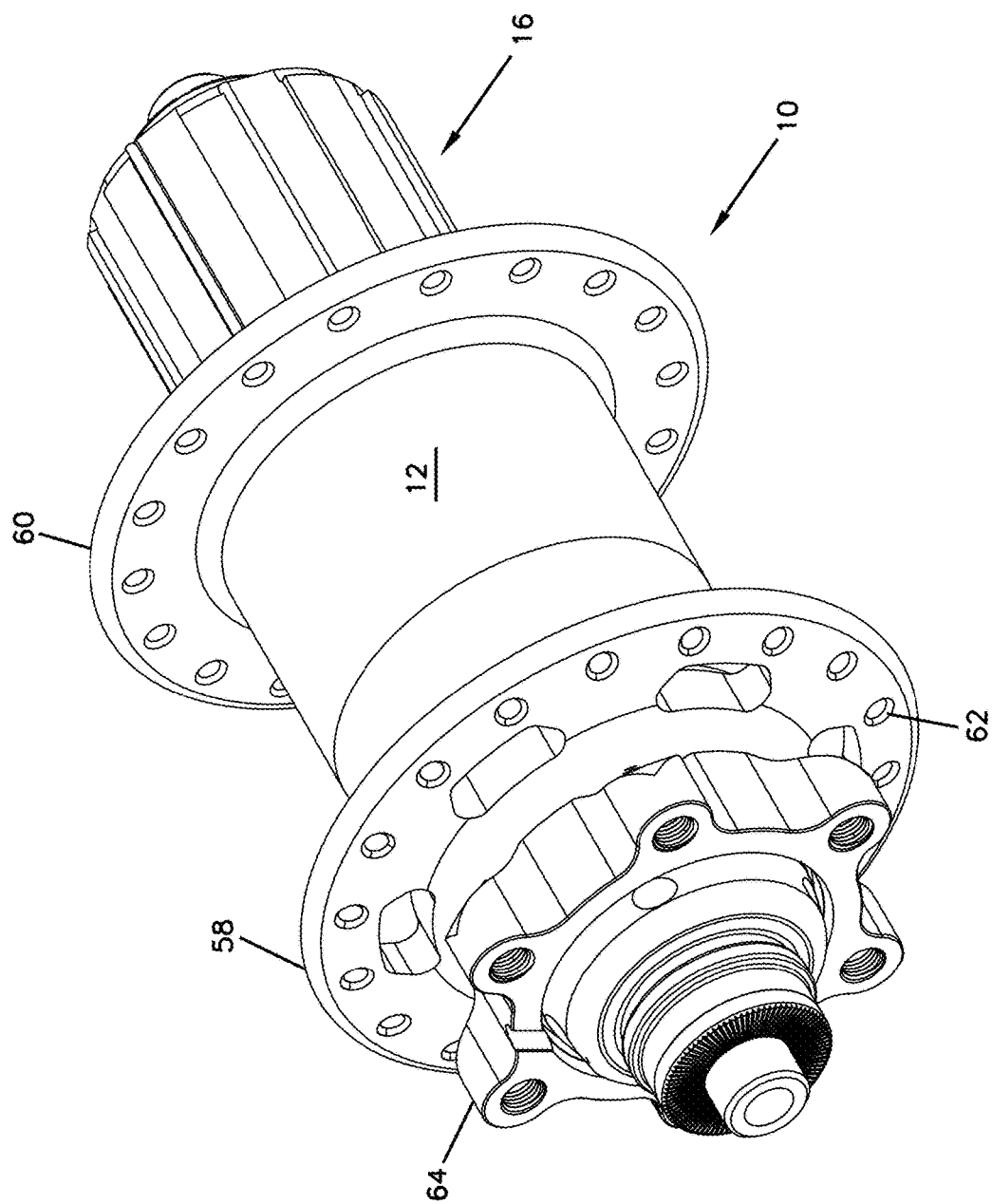
FIG. 1 is an isometric view of a hub according to the principles of the present disclosure.
Figure 2:
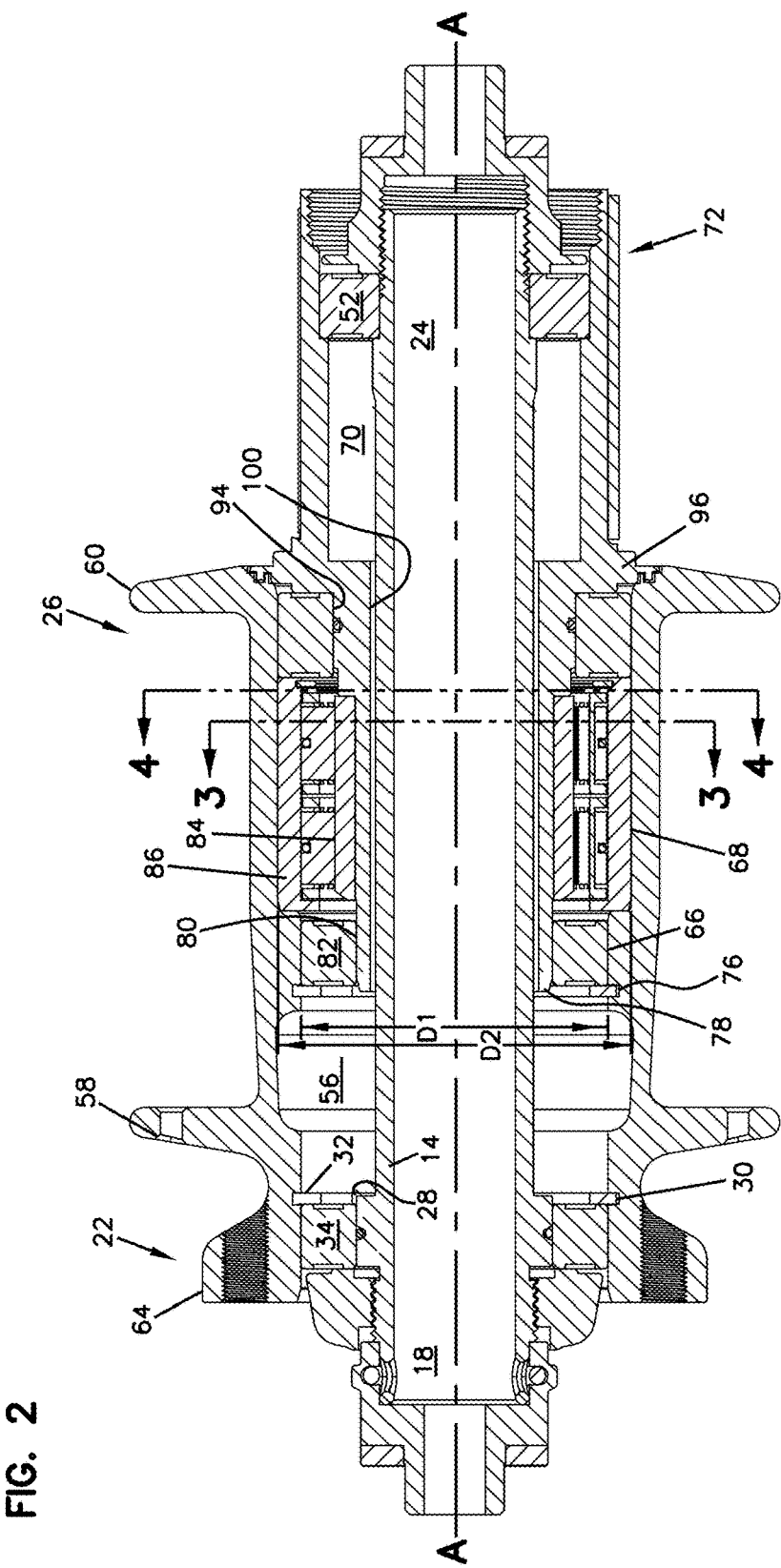
FIG. 2 is a longitudinal cross-sectional view of the hub of FIG. 1.
Figure 3:
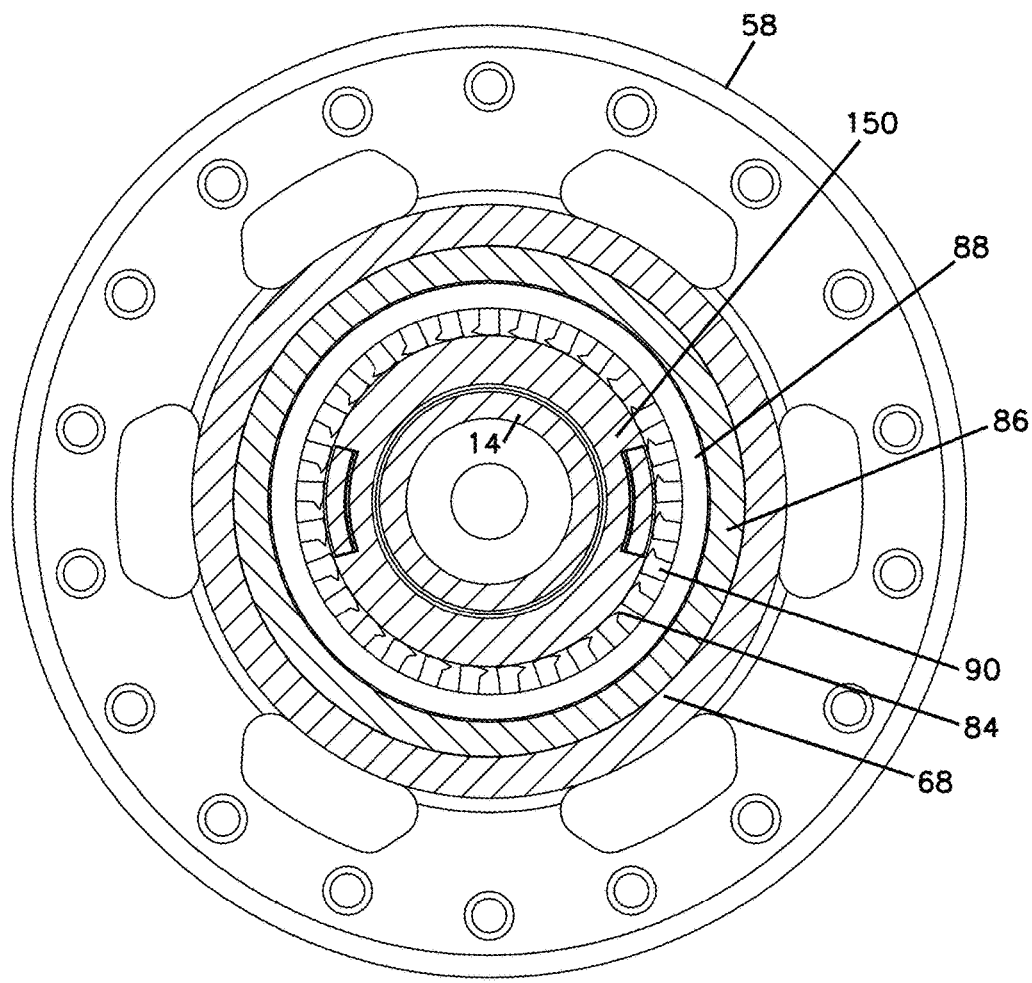
FIG. 3 is a cross-sectional view of the hub along line 3-3 of FIG. 2.
Figure 4:
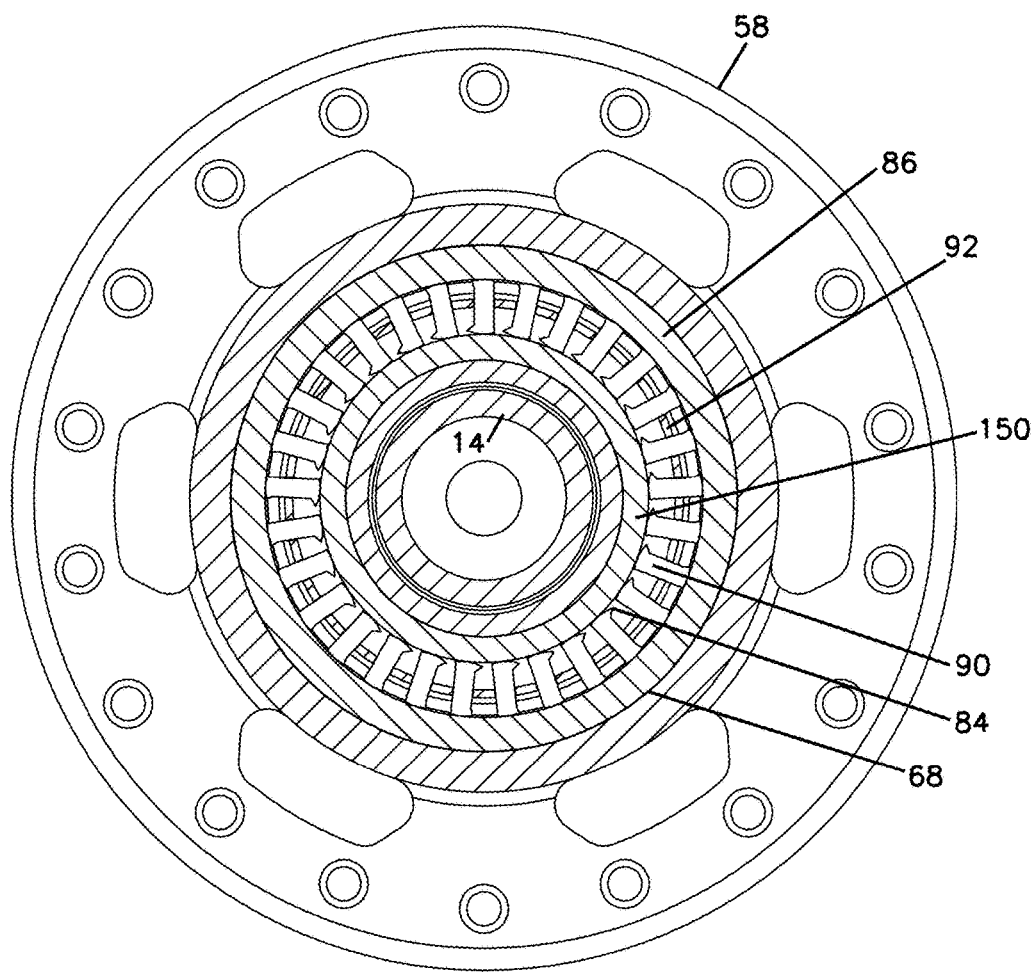
FIG. 4 is a cross-sectional view of the hub along line 4-4 of FIG. 2.
Figure 5:
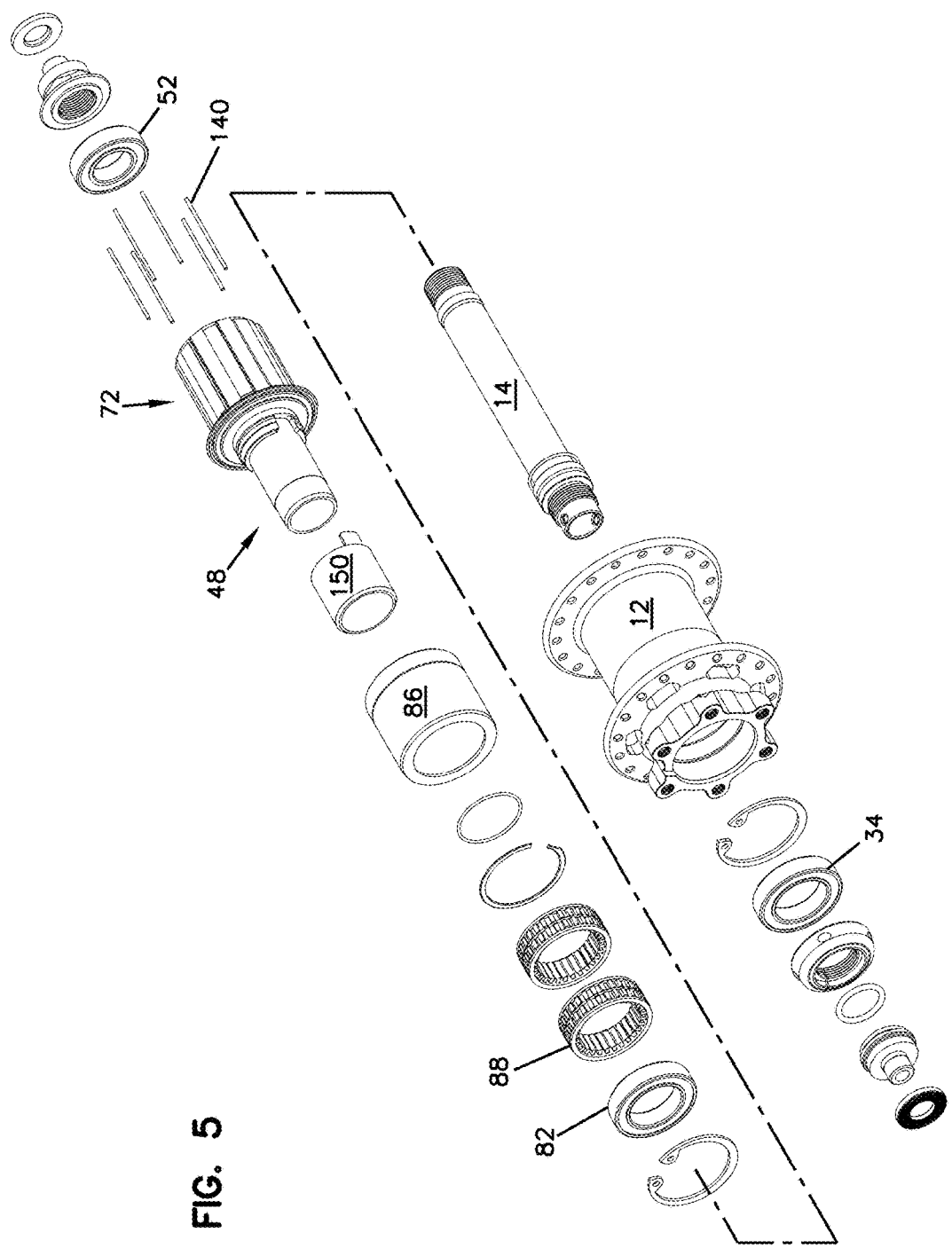
FIG. 5 is an exploded assembly view of the hub of FIG. 1.

Referring to FIG. 1, a first embodiment of a hub according to the present disclosure is shown. In the depicted embodiment, the hub 10 includes a hub body 12, an axle 14, and cassette driver 16. In the depicted embodiment, the hub 10 is configured to freewheel. In other words, a cassette driver 16 rotates with the hub body 12 when the wheel is driven by the cassette driver 16 and the cassette driver 16 rotates relative to the hub body 12 when the wheel is coasting (rotating and not being driven).

Referring to the FIGS. generally, the configuration of hub 10 is described in greater detail. In the depicted embodiment, the hub 10 is configured for use with multiple speed bicycles (e.g., road bikes, mountain bikes, etc.) that utilize an external cassette driven by a chain. In the depicted embodiment, the axle 14 is co-axially arranged within the hub body 12. In particular, the axle 14 extends through the hub body 12. The axle 14 includes a first end portion 18 that is positioned within a first end portion 22 of the hub body 12 and a second opposed end portion 24 that includes a portion that extend outwardly from a second end 26 of the hub body 12. It should be appreciated that the principles of the present disclosure can alternatively be integrated into a single speed bicycle.

In the depicted embodiment, the first end portion 18 of the axle includes a shoulder 28. The hub body 12 includes a snap ring groove 30 aligned with the shoulder 28 in a radial direction such that a snap ring 32 and the shoulder 28 cooperatively limit the axial movement of a bearing set 34 in a direction toward the second end 26 of the hub body 12. The bearing set 34 engages an exterior surface of the axle and an interior surface of an internal cavity 56 of the hub body 12.

In the depicted embodiment, the second end portion 24 of the axle 14 is co-axially arranged within both the hub body 12 and a drive end portion 48 of the cassette driver 16. In the depicted embodiment, a portion of the second end portion 24 of the axle 14 extends into a driven end of the cassette. In the depicted embodiment, the second end of portion 24 of the axle 14 interfaces with the cassette driver 16 via bearing set 52.

In the depicted embodiment, the hub body 12 includes a one-piece construction. The hub body 12 is machined from a single piece of aluminum (e.g., aluminum 7075T651). The hub body 12 defines a longitudinal rotational axis A-A. The hub body 12 includes the internal cavity 56 that receives the axle 14 as well as the drive end portion 48 of the cassette driver 16. The hub body 12 includes a first radially extending flange 58 located at the first end portion 22 of the hub body 12, and a second radially extending flange 60 located at the second end 26 of the hub body 12. Each of the radially extending flanges 58, 60 includes a plurality of spaced apart through apertures 62 that are configured to secure spokes. Adjacent the first radially extending flange 58 is a disk brake mount flange 64 configured to support a disk of a disk brake system. The external cylindrical body of the hub body 12 tapers from the second flange 60 towards the first flange 58. In other words, the exterior diameter of the hub body 12 adjacent the second flange 60 is greater than the exterior diameter of the hub body 12 adjacent the first flange 58.

In the depicted embodiment, the wall thickness of the hub body 12 is greater in the portion that radially overlaps the drive end portion 48 of the cassette driver 16 as compared to the portion that does not overlap the cassette driver 16. In the depicted embodiment, the internal cavity 56 of the second end portion 26 of the hub body defines two internal cylindrical surfaces. A first cylindrical surface 66 is defined as being a distance D1 from the longitudinal rotational axis A-A, and a second cylindrical surface 68 is defined as being a distance D2 from the longitudinal rotational axis A-A. In the depicted embodiment, D2 is greater than D1 and the first surface 66 is closer to the first end portion 22 of the hub body 12 than the second cylindrical surface 68. In the depicted embodiment, the hub body is machined in a process whereby the hub body is not removed from a spindle until both the first and second cylindrical surfaces 66, 68 are machined.

In the depicted embodiment, the cassette driver 16 includes an internal cavity 70 that extends from a drive end portion 48 to an opposed driven end portion 72. The cavity receives the axle 14, which extends into the drive end portion 48 of the cassette driver 16. The cassette driver 16 defines a longitudinal axis of rotation that is coaxial and coincident with the axis of rotation A-A of the hub body 12.

In the depicted embodiment, the drive end 48 of the cassette driver 16 includes a plurality of coaxial cylindrical surfaces that are positioned within the hub body 12 opposite the internal cylindrical surfaces 66, 68 of the hub body 12. In the depicted embodiment, an annular snap ring groove 76 is located in the first cylindrical surface 66 of the inner cavity 56 of the hub body 12 opposite an end face 78 of the drive end portion 48 of the cassette driver 16. A first cylindrical surface 80 extends from the end face 78 of the cassette driver towards the driven end 72 of the cassette driver 16. The first cylindrical surface 80 of the drive end 48 together with the first cylindrical surface 66 defines a first annular cavity that receives bearing set 82 that interfaces between the drive end 48 of the cassette driver 16 and the hub body 12.

In the depicted embodiment, a second cylindrical surface 84 having a larger diameter than the first cylindrical surface 80 extends from the first cylindrical surface 80 towards the driven end 72 of the cassette driver 16. The second cylindrical surface 84 of the drive end 48 together with the second cylindrical surface 68 defines an annular cavity that receives a sprag clutch assembly. In the depicted embodiment, the surface finish of the second cylindrical surface 84 is less than or equal to Rz of 2.5 micrometers and has a HRC hardness of at least 56 (e.g., between 58 to 62). In the depicted embodiment, the second cylindrical surface 84 has a diameter of greater than 22 mm (e.g., 29 mm). In the depicted embodiment, the second cylindrical surface is constructed of stainless steel.

In the depicted embodiment, the sprag clutch assembly includes a sprag sleeve 86, a sprag retaining cage 88, sprags 90, and a tensioning band 92. In the depicted embodiment, the surface finish of the inside surface of the sprag sleeve is less than or equal to Rz of 2.5 micrometers and the inside surface of the sprag sleeve has a HRC hardness of at least 56 (e.g., between 58 to 62). In the depicted embodiment, the sprag sleeve 86 has a diameter of less than 40 mm (e.g., 37 mm). The sprag sleeve has a height dimension that is greater than the height dimension of the sprag retaining cage 88. The sprag sleeve 86 includes a snap ring groove that receives a snap ring that limits the axial movement of the sprag retaining cage 88 in the axial direction towards the driven end 72 of the cassette driver.

In the depicted embodiment, the sprag sleeve is constructed of a 5210 bearing race type steel which is pressed fit/interference fit into the second cylindrical surface 68 of the hub body 12. The construction of the sprag sleeve 86 and the hub body 12 cooperatively provide the structural stiffness needed for reliable and long lasting operation of the hub despite the strong radial forces that are generated by the sprags 90. The sprags and sprag cages used in the depicted embodiment are currently available commercially from GMN Paul Müller Industrie GmbH & Co. KG.

In the depicted embodiment, a third cylindrical surface 94 extends coaxially from the second cylindrical surface 84 towards the driven end 72 of the cassette driver 16. The third cylindrical surface 94 has a diameter that is greater than the diameter of the second cylindrical surface 84. A shoulder 96 is provided on the cassette driver 16 between the third cylindrical surface 94 and the driven end 72 of the cassette driver 16. The third cylindrical surface 94 of the drive end 48 of the cassette driver 16 together with the second cylindrical surface 68 defines a first annular cavity that receives bearing set 98 that interfaces between the drive end 48 of the cassette driver 16 and the hub body 12. The shoulder 96 limits axial movement of the bearing set 98 in the direction towards the driven end 72 of the cassette driver 16. An end face of the sprag sleeve 86 limits axial movement of the bearing set 98 on the axial direction towards the first cylindrical surface 80 of the drive end 48 of the cassette driver 16. In the depicted embodiment the third cylindrical surface 94 includes an annular o-ring groove configured to receive an o-ring that seals the interface between the third cylindrical surface 94 and the bearing set 98.

In the depicted embodiment, the internal cavity of the drive end 48 of the cassette driver includes a first cylindrical surface 100 defined by a first diameter that is greater than the diameter of the axle. The configuration results in further weight savings and strength of the cassette driver and facilitates precision manufacturing thereof.

In the depicted embodiment the configuration results in a high performance hub as it has the strength and durability to withstand intense use while also being lightweight and smooth in operation. The hub body 12 is constructed of lightweight, relatively softer aluminum material, and it is designed so that it can be manufactured with high precision as the above-referenced cylindrical surfaces 66, 68 can be machined without detaching the hub body 12 from the chuck that holds the part during machining. The hard and robust sprag sleeve 86 is pressed into the softer aluminum. The pressing process creates a tight interference fit between the sprag sleeve 86 and cylindrical surface 68. This interface allows the hub body 12 to work together to resist the radial forces generated by the sprags. The sprag sleeve 86 provides the hardened surface that interfaces with the sprags and also provides additional structural strength to the hub. The hub of the depicted embodiment does not require rebuilding and can operate in extreme environments including environments as cold as −50 degrees Fahrenheit.

In the depicted embodiment, the sprag retaining cage 88 moves with the cassette driver 16. The tensioning member (e.g., spring) on the sprag retaining cage 88 biases the individual sprags against the cylindrical surface 84 of the cassette driver 16 resulting in the sprag retaining cage 88 being essentially tension mounted to cassette driver 16. The internal ends of the sprags contact the second external surface 84 of the cassette driver and are biased radially outwardly against a spring and extend radially slightly beyond the periphery edge of the sprag retaining cage 88. This configuration results in little and light contact between the sprags and the sprag sleeve 86 during coasting, which results in a very low friction configuration as the clutch configuration is disengaged during coasting. The non-drive forces applied between the hub body 12 and the cassette driver 16 are transferred through the bearing sets 82, 98 that sandwich the sprag clutch assembly.

In the depicted embodiment, as soon as the driven end 72 is rotated in the drive direction at a rotational speed that exceeds the rotational speed in the drive direction of the hub body 12, the sprags engage and lock against the sprag sleeve 86 and transfer torque from the cassette driver 16 to the hub body 12. In the depicted embodiment, the sprag clutch assembly transfers torque to drive the hub forward. However, the sprag clutch assembly is not relied on as a bearing set to support the relative rotation between the cassette driver 16 and the hub body 12. This configuration results in a clutch configuration that immediately engages when the driven end is driven. For example, in the depicted configuration the driven end cannot be rotated relative to the hub body in the drive direction more than a small amount before it fully engages and transfers torque from the cassette driver 16 to the hub body 12, thereby causing the hub body to rotate with the cassette driver 16. The amount of relative rotation in the drive direction, commonly referred to as play or slop, can be less than five degrees (e.g., less than two degrees, less than one degree, or one half of a degree).

In the depicted embodiment, the driven end portion 72 is connected to the drive end portion. As discussed above, the drive end portion includes a plurality of coaxial cylindrical surfaces. In the depicted embodiment, the driven end portion 72 is formed of aluminum and includes a cylindrical body portion 110 with a plurality of axially extending raised splines 112 spaced apart on the cylindrical body portion 110. In the depicted embodiment, adjacent splines define channels 134 therebetween. In the depicted embodiment the splines extend axially from a back wall 138 located at an end portion of the cylindrical body portion. The splines 112 are configured to engage a cassette comprised of sprockets and spacers. It should be appreciated that in alternative embodiments, the driven end portion is not integral connected to the drive end portion (e.g., they are separate components).

In the depicted embodiment, at least one of the splines is integrally formed on the surface of the cylindrical body portion 110 of the cassette driver. The at least one spline 114 includes a drive side 116, which including a reinforcement engagement member 118. In the depicted embodiment, at least three of the splines 114, 120, 122 are integrally formed on the surface of the driven end portion of the cassette driver. In the depicted embodiment, all of the splines are integrally formed on the surface of the cassette driver. However, many other alternative are also possible.

Figure 6:
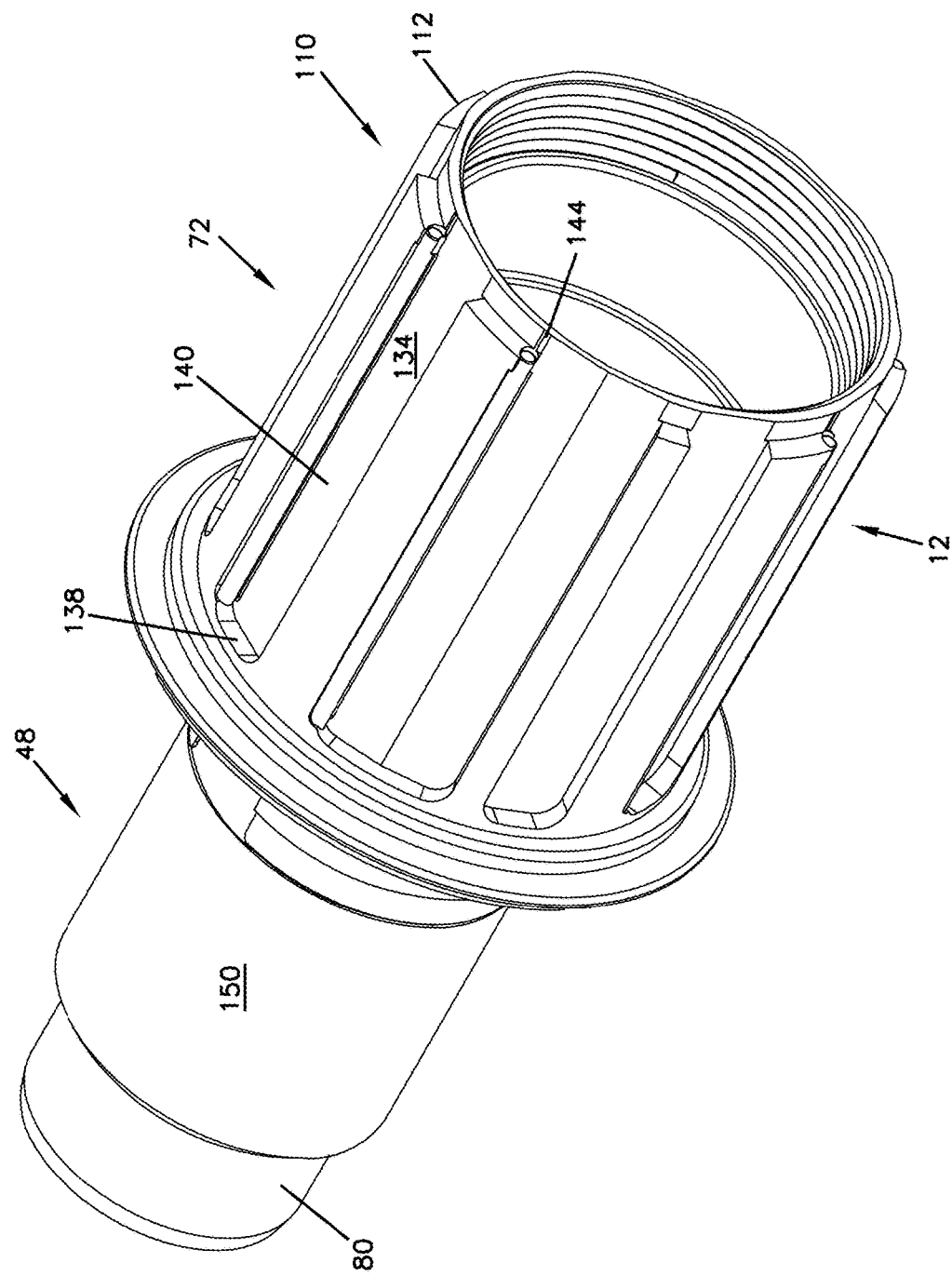
FIG. 6 is a first perspective view of a first embodiment of the cassette driver.
Figure 7:
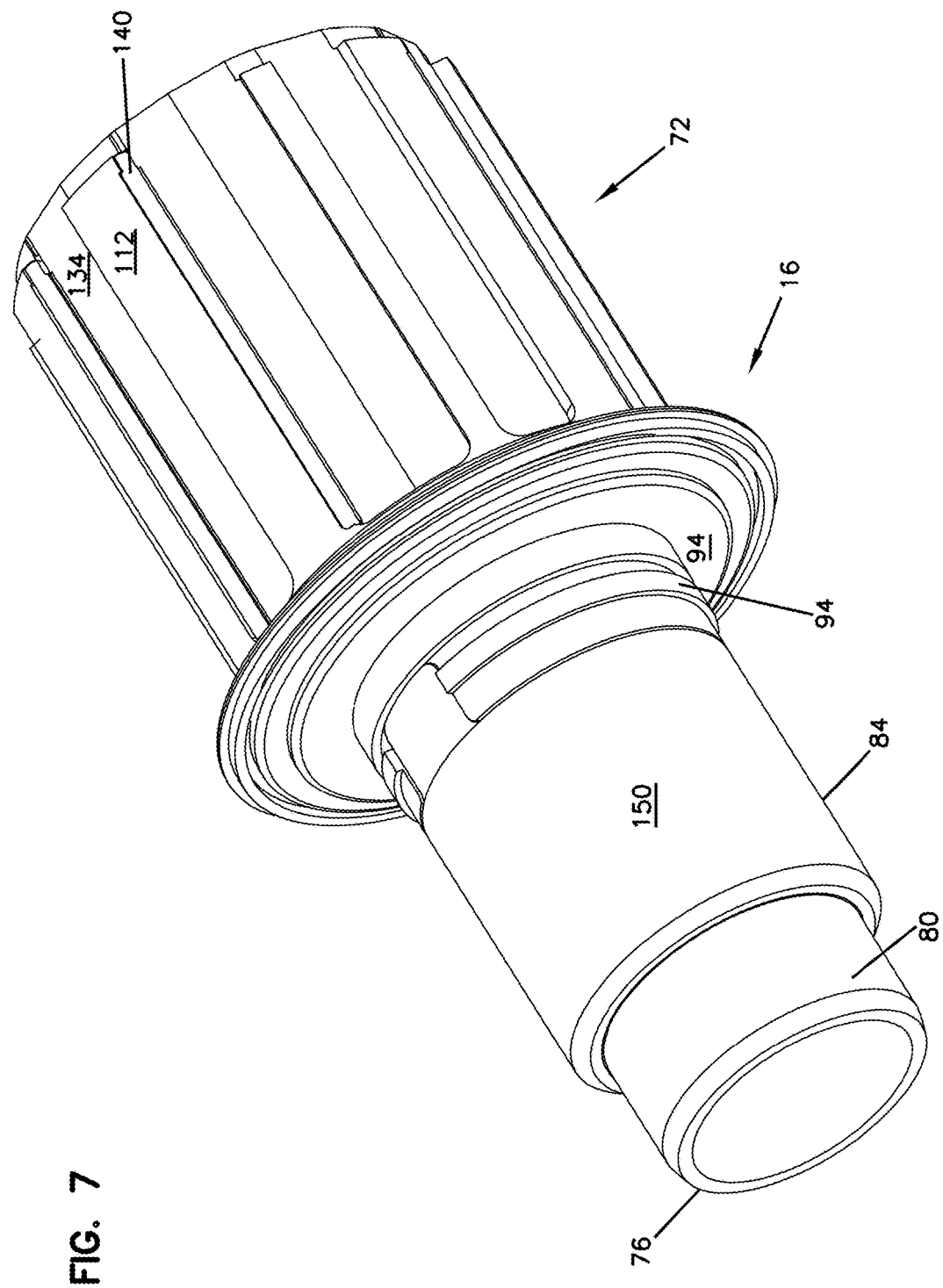
FIG. 7 is a second perspective view of the embodiment of the cassette driver of FIG. 6.

In the depicted embodiment, the at least three splines each include a drive side 116, 124, 126. Each of the drive sides of the splines includes a reinforcement engagement member 118, 128, 130. The reinforcement engagement members can include a portion having a radius surface 132 (see FIG. 8). Additionally or alternatively, the reinforcement engagement member can include an undercut surface 136 on the drive side of the spline (see FIG. 9). Also, additionally or alternatively, the reinforcement engagement members can be at least partially recessed into grooves 144 in the channel 134 between adjacent splines (see FIG. 6). Additionally or alternatively, the reinforcement engagement member can include a round pin receiving aperture 142 configured to receive an end of a round pin (see FIGS. 10 and 11). Additionally or alternatively, the reinforcement engagement member is configured to receive a reinforcement member radially and secure the reinforcement member adjacent the drive side of the spline (see FIG. 8). Alternatively, the reinforcement engagement member is configured to receive a reinforcement member axially and secure the reinforcement member adjacent the drive side of the spline (see FIGS. 10 and 11). It should be appreciated that many configurations are possible.

Figure 8:
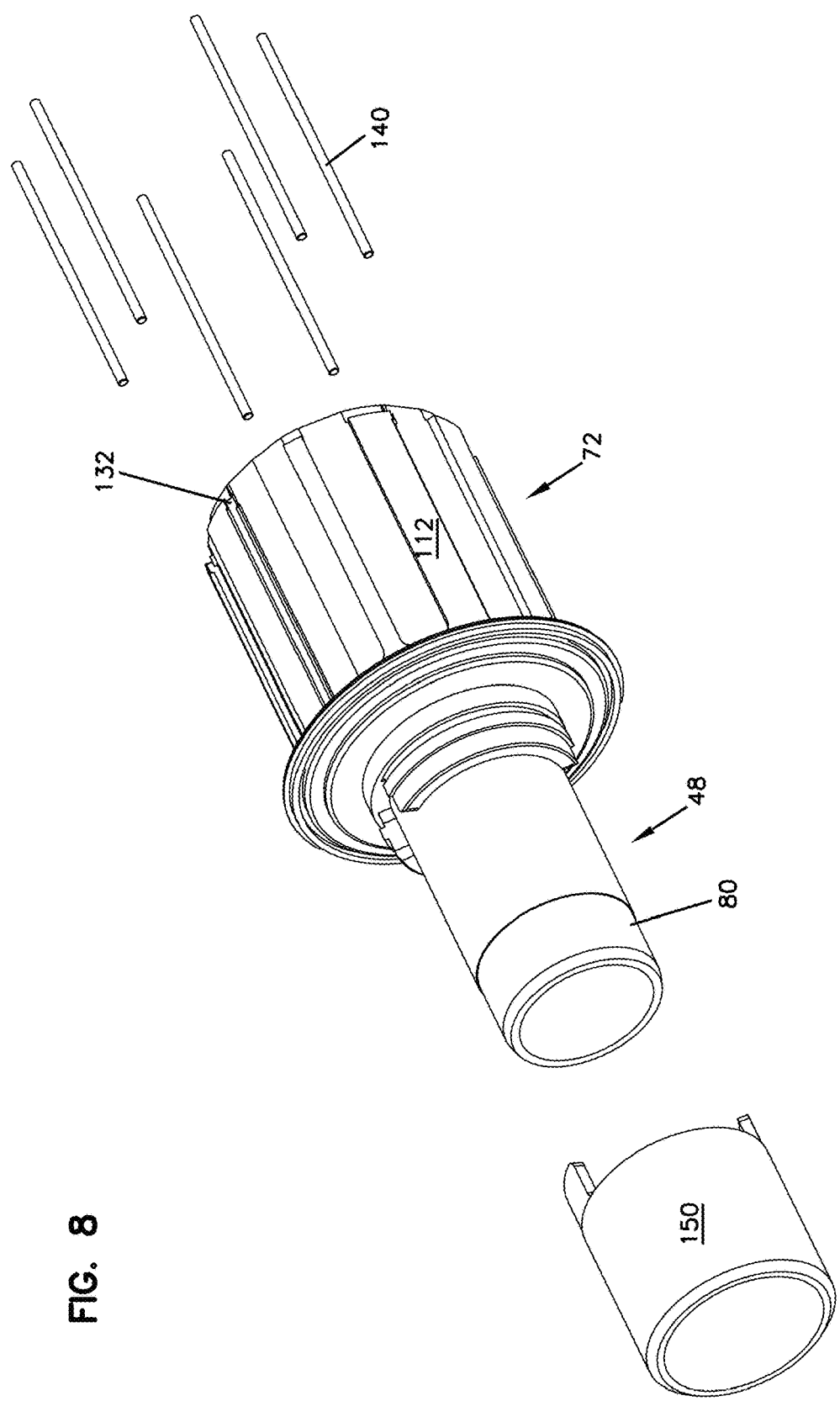
FIG. 8 is an assembly view of the first embodiment of the cassette driver of FIG. 6.
Figure 9:
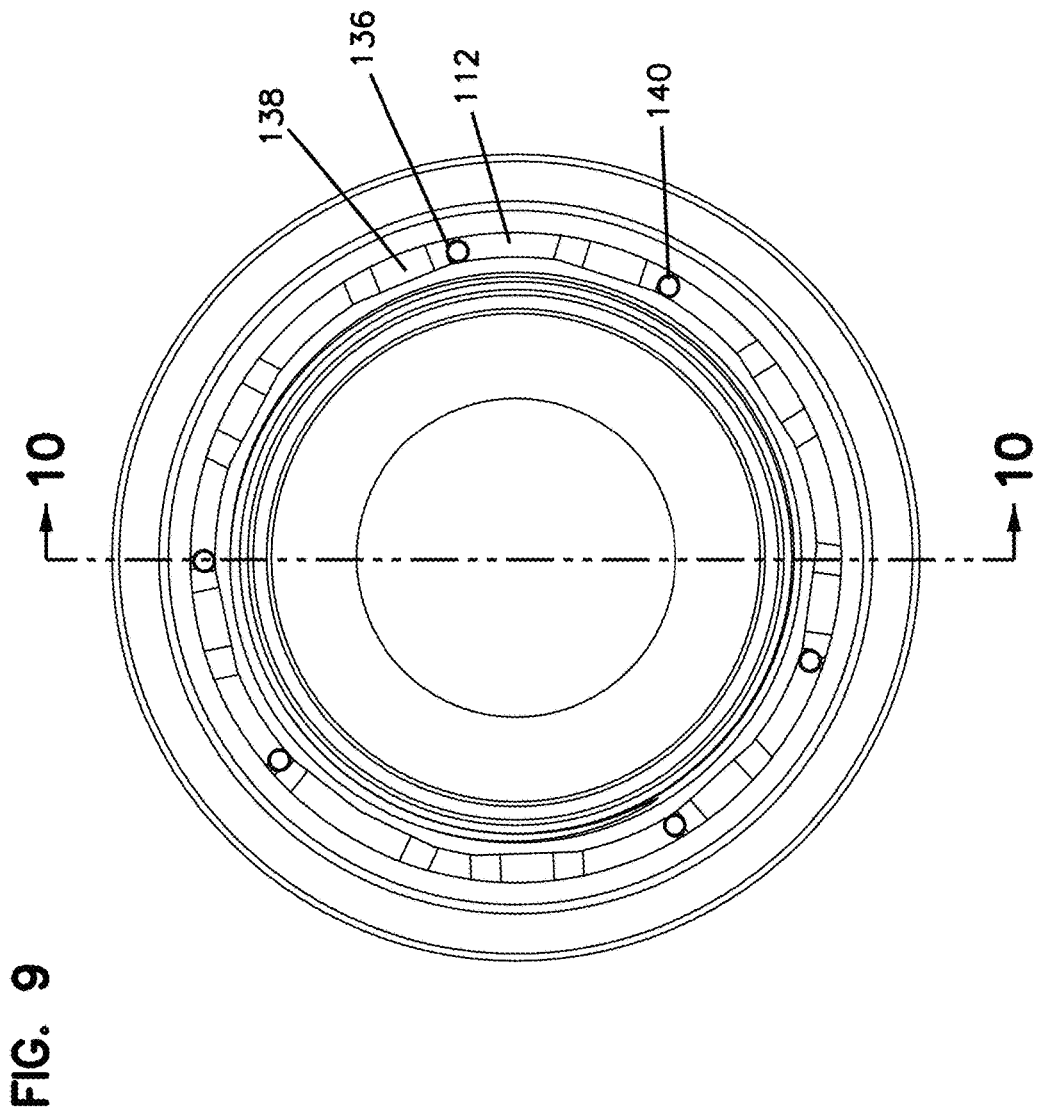
FIG. 9 is a cross sectional view of the cassette driver of FIG. 6 along line 9-9 of FIG. 10.
Figure 10:
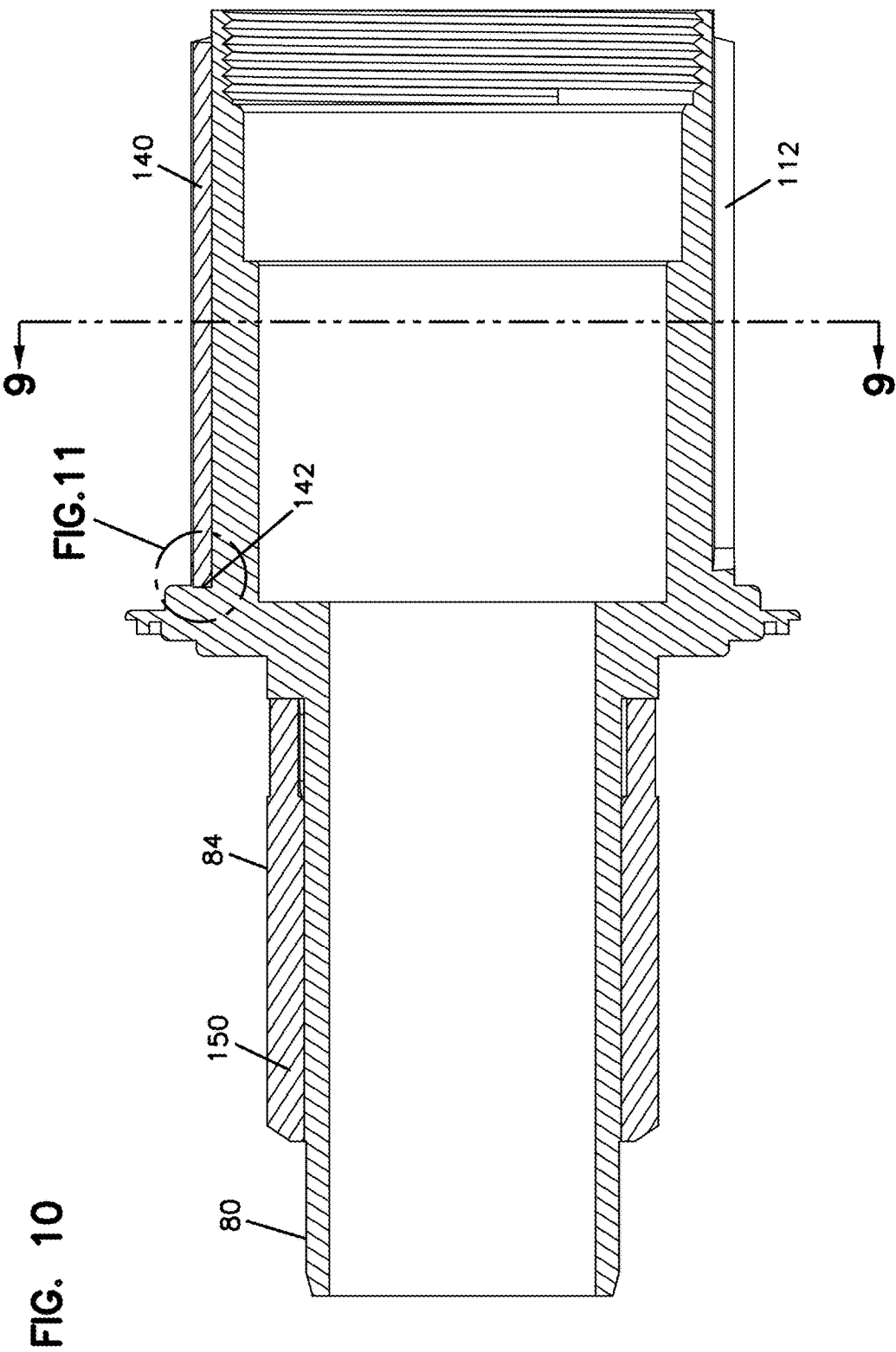
FIG. 10 is a cross sectional view of the cassette driver of FIG. 6 along line 10-10 of FIG. 9.
Figure 11:
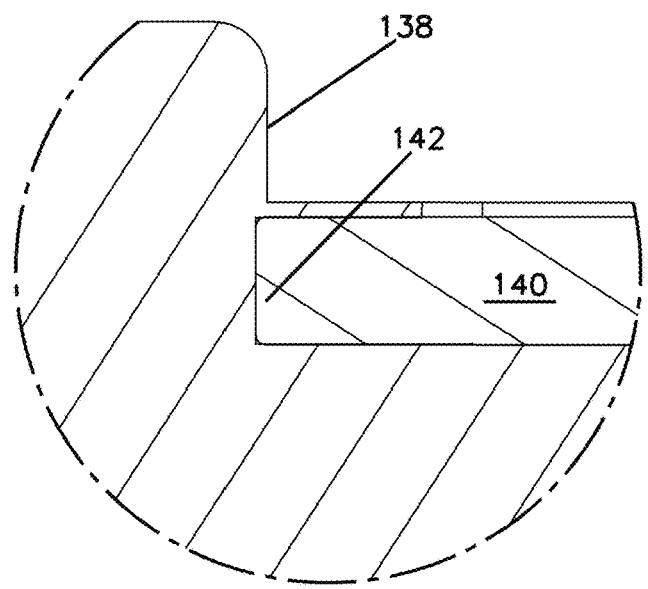
FIG. 11 is an enlarged view of a portion of FIG. 10.
Figure 12:
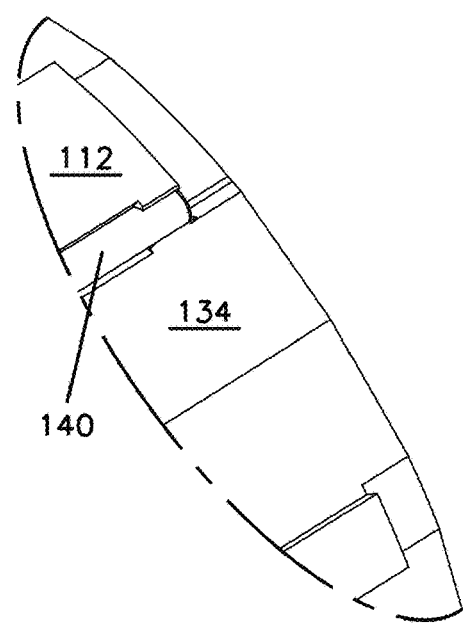
FIG. 12 is an enlarged view of a portion of FIG. 8.
Figure 13:
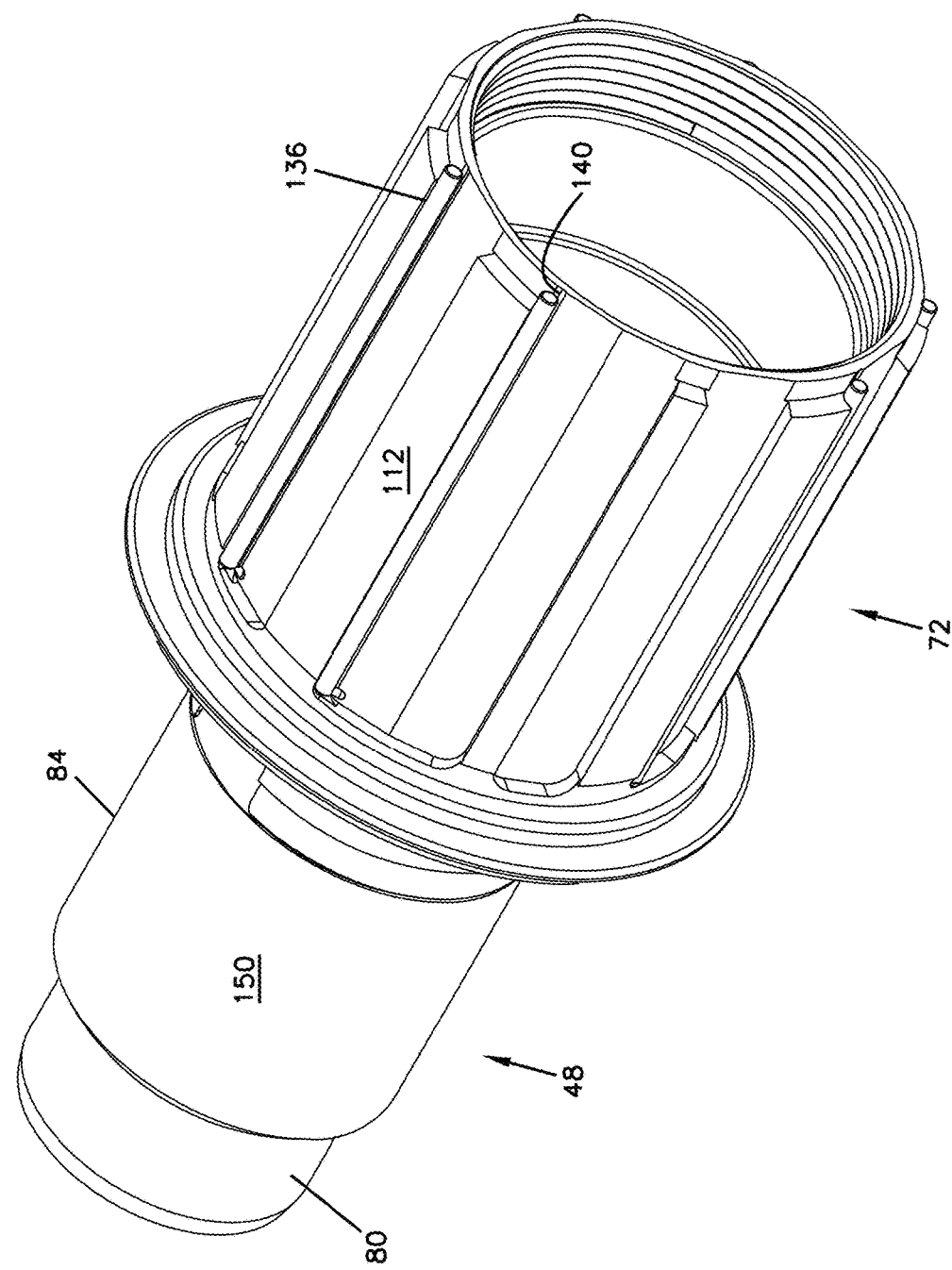
FIG. 13 is a first perspective view of a second embodiment of the cassette driver.
Figure 14:
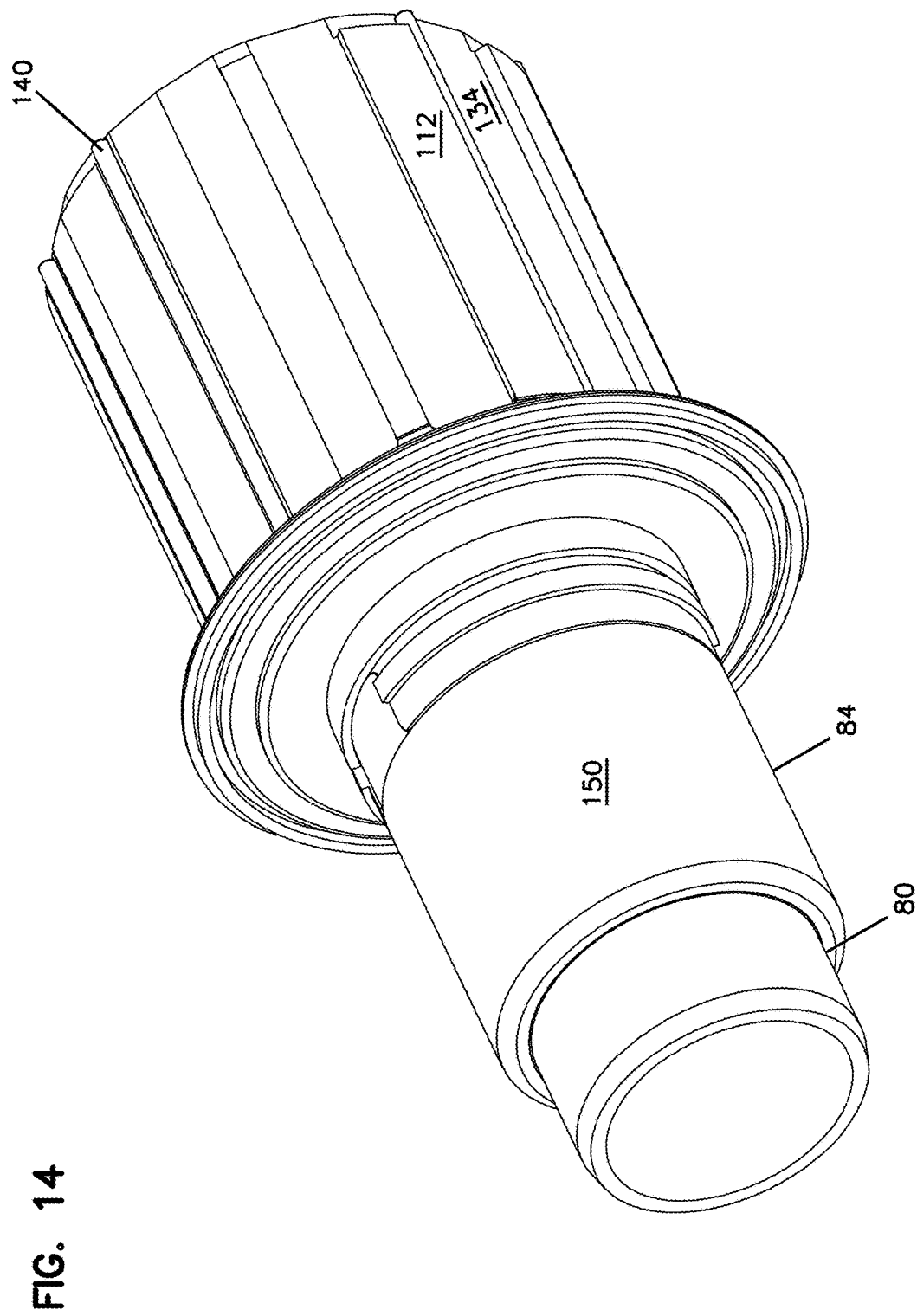
FIG. 14 is a second perspective view of the embodiment of the cassette driver of FIG. 13.
Figure 15:
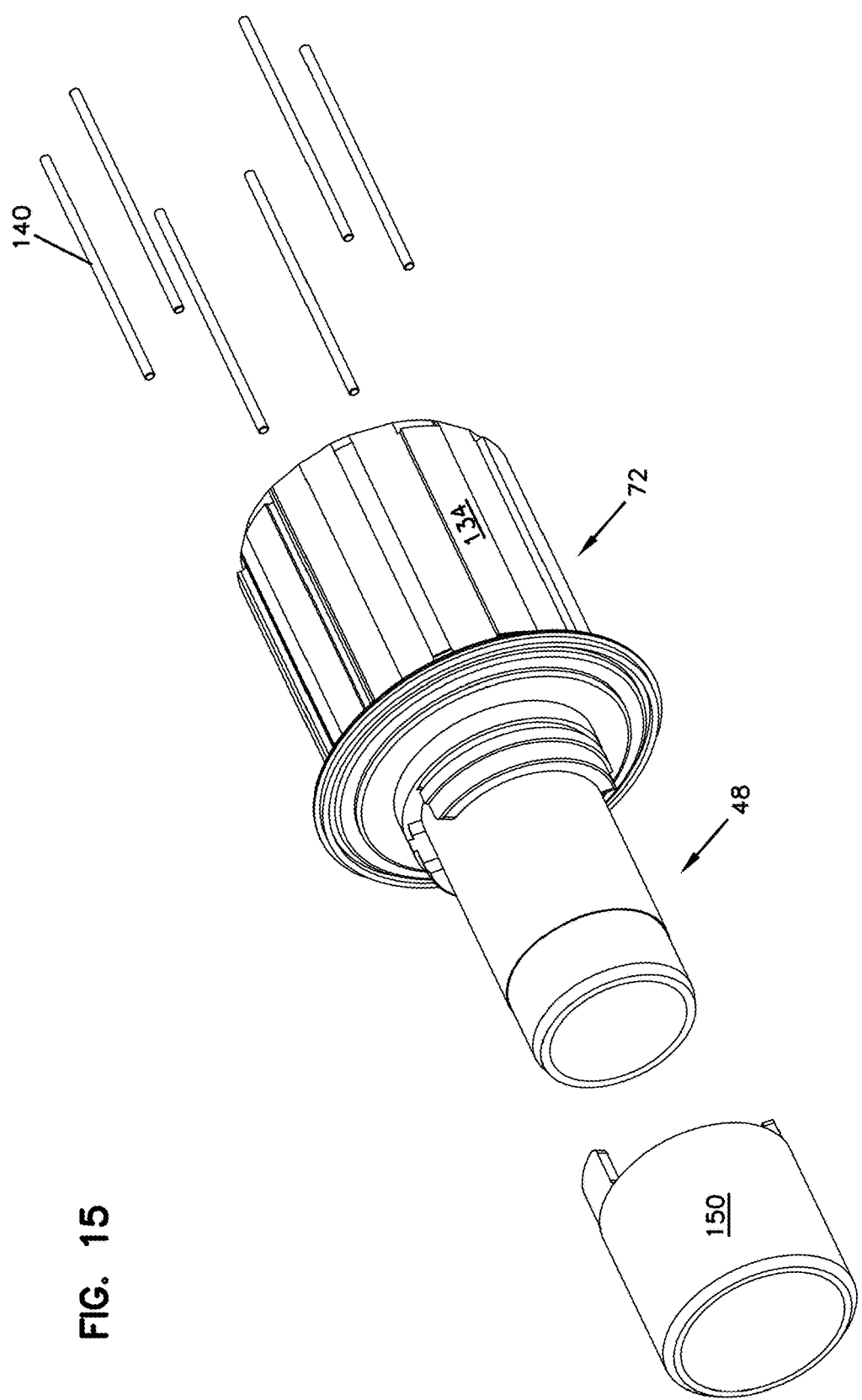
FIG. 15 is an assembly view of the first embodiment of the cassette driver of FIG. 13.
Figure 16:
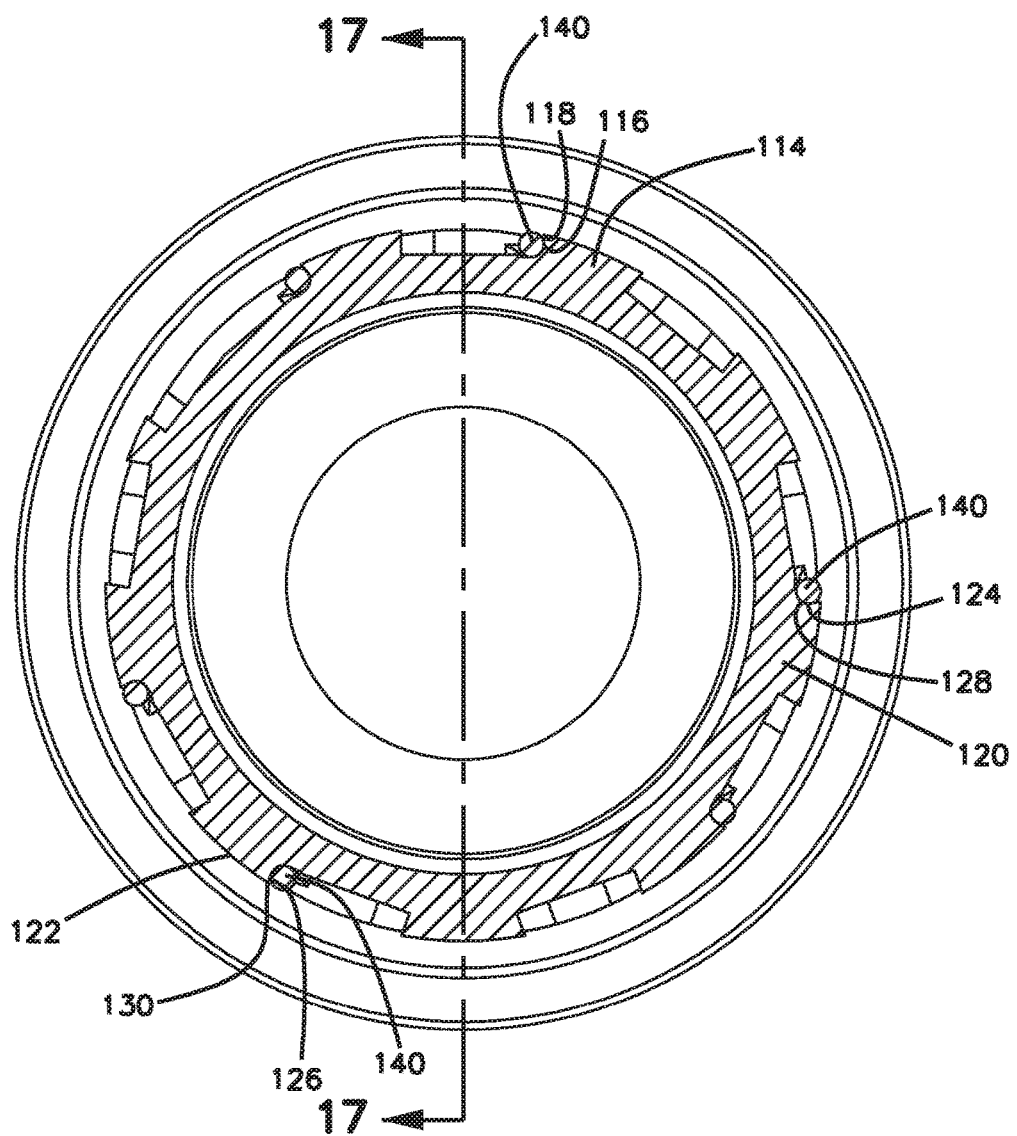
FIG. 16 is a cross sectional view of the cassette driver of FIG. 13 along line 16-16 of FIG. 17.
Figure 17:
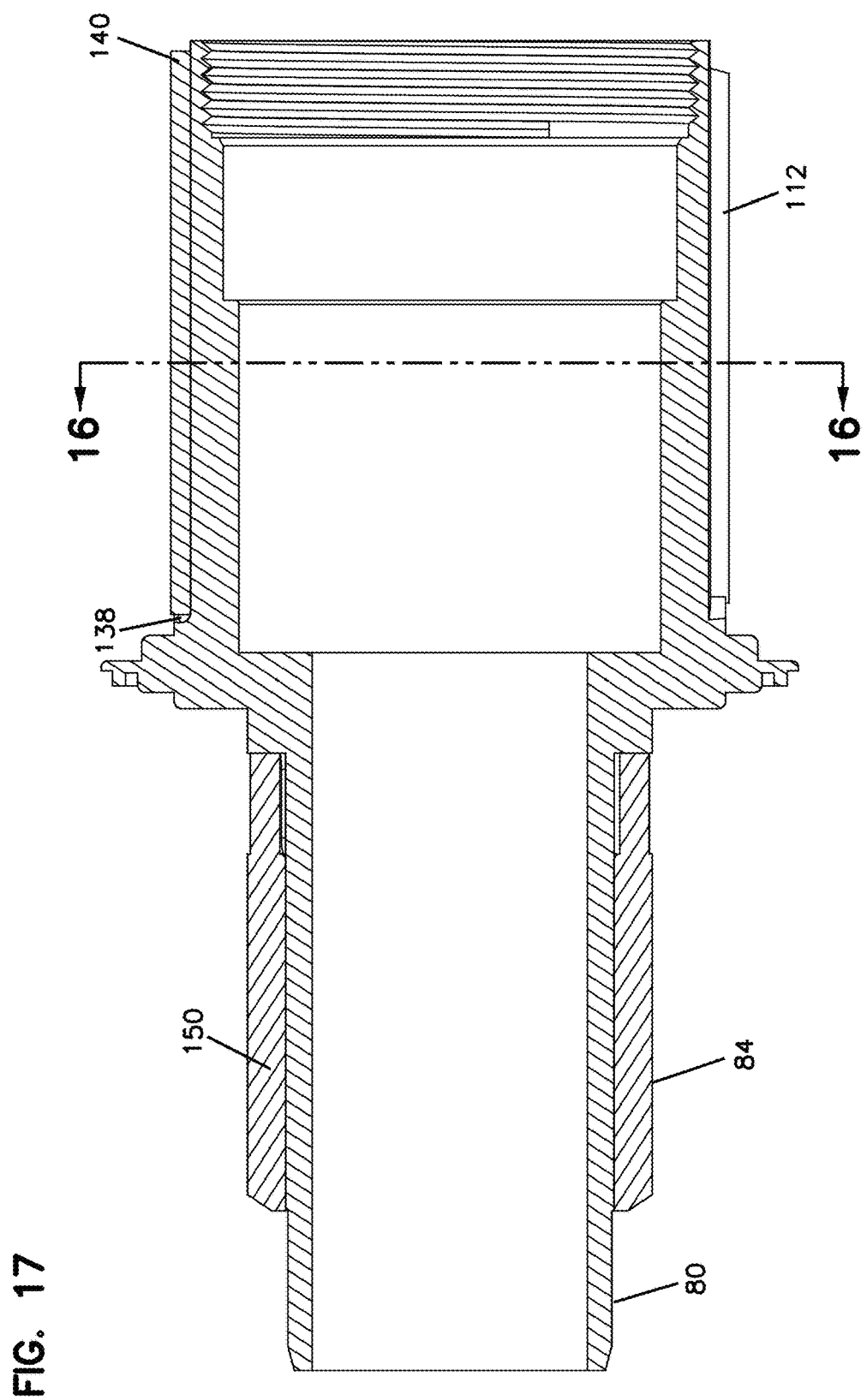
FIG. 17 is a cross sectional view of the cassette driver of FIG. 13 along line 17-17 of FIG. 16.
Figure 18:
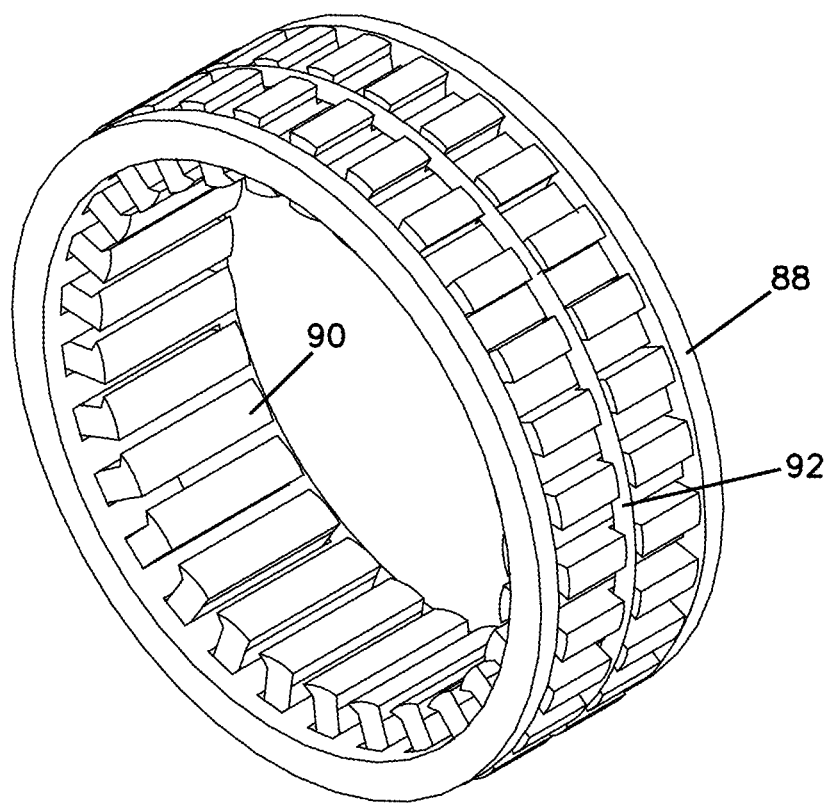
FIG. 18 is a perspective view of a component of a hub shown in FIG. 2 according to the present disclosure.

In the depicted embodiment, the drive end portion of the cassette drive includes at least one reinforcement member 140. In the depicted embodiment, the reinforcement member has a HRC hardness of at least at least 56 (e.g., between 58 to 62) and is engaged with the reinforcement engagement member. In the depicted embodiment, the reinforcement member is a round steel pin. In some embodiments, the round pin can be snapped into engagement with the reinforcement engagement member (FIG. 8). In some embodiments, the end of the reinforcement member (e.g., round pin) is pressed into an aperture 142 on the back wall 138 (FIGS. 10 and 11). In the depicted embodiment, the distance from a rotational axis to a far edge of the reinforcement member does not exceed the distance from the rotational axis to a top surface of the spline (i.e., the reinforcement member is flush with or less than flush with the top of the spline).

The present disclosure also provides a method of manufacturing a hub. The method includes the step of machining a cassette driver from an aluminum body. The step of machining includes forming a drive end portion 48 and a driven end portion 72, wherein the drive end portion includes a plurality of coaxial cylindrical surfaces and the driven end portion includes a cylindrical body portion including a plurality axially extending raised splines 112 spaced apart on the cylindrical body portion 110, wherein the splines define a plurality of channels 134 between adjacent spline. In the depicted embodiment, at least one spline includes a drive side, the drive side including a reinforcement engagement member 118.

The method can further include the step of securing a reinforcement member to the reinforcement engagement member. The method can further include connecting a steel insert 150 over the drive end portion of the cassette driver and machining the steel insert thereafter. The step of connecting the steel insert can include the step of pressing the steel insert into engagement with the drive end portion of the cassette driver or threading the insert thereon. The step of connecting the steel insert can include the step of axially aligning tangs with notches in the drive end of the cassette driver. The tangs once engaged with the notches prevent relative rotation of the steel insert relative to the cassette driver. In the depicted embodiments the steel insert includes two tangs which are opposed and have curved exterior and interior surfaces. It should be appreciated that many other configurations are possible including for example configuration with more or less tangs (e.g., four tangs). The step of machining the steel insert after connecting it to the steel driver can be used to ensure its concentricity with the other cylindrical surface of the drive end portion 48 of the cassette driver. Many other connection methods are also possible.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A cassette driver comprising:
a cylindrical body portion;
a plurality of axially extending raised splines spaced apart on the cylindrical body portion;
a drive end portion connected to the cylindrical body portion, the drive end portion including a plurality of coaxial cylindrical surfaces, wherein the drive end portion and cylindrical body portion are integrally formed;
wherein at least one of the splines is integrally formed on the surface of the cylindrical body portion of the cassette driver; and
wherein the at least one spline includes a drive side, the drive side including a reinforcement engagement member.

2. The cassette driver of claim 1, wherein the reinforcement engagement member is an undercut surface on the drive side of the spline.

3. The cassette driver of claim 1,
wherein at least three of the splines are integrally formed on the surface of the cylindrical body portion of the cassette driver; and
wherein the at least three splines include a drive side, the drive side including a reinforcement engagement member, the reinforcement engagement member including a portion having a radius surface.

4. The cassette driver of claim 1, further comprising a reinforcement member having a hardness of at least HRC 56, the reinforcement member engaged with the reinforcement engagement member.

5. The cassette driver of claim 4, wherein adjacent splines define a channel therebetween, and wherein the reinforcement member is at least partially recessed into the channel.

6. The cassette driver of claim 5, wherein the distance from a rotational axis to a far edge of the reinforcement member does not exceed the distance from the rotational axis to a top surface of the spline.

7. The cassette driver of claim 1, further comprising a back wall, wherein the splines extend axially from the back wall, wherein the back wall includes a round pin receiving aperture configured to receive an end of a round pin.

8. The cassette driver of claim 7, further comprising a round pin having an end pressed into the pin receiving aperture.

9. The cassette driver of claim 1, wherein the reinforcement engagement member is configured to receive a reinforcement member axially and secure the reinforcement member adjacent the drive side of the spline.

10. The cassette driver of claim 1, wherein the reinforcement engagement member is configured to receive a reinforcement member radially and secure the reinforcement member adjacent the drive side of the spline.

11. The cassette driver of claim 10, wherein the reinforcement member is a round pin and the round pin is snapped into engagement with the reinforcement engagement member.

12. The cassette driver of claim 1, wherein the drive end portion and the cylindrical body portion are integrally formed of aluminum.

13. A hub assembly comprising:
a drive end portion of a cassette driver, wherein the drive end portion includes:
a plurality of coaxial cylindrical surfaces; and
a radially extending flange;
a driven end portion of the cassette driver connected to the drive end portion, wherein the driven end portion includes:
a cylindrical body portion integrally extending from the flange to a distal end of the cassette driver; and
a plurality axially extending raised splines spaced apart on the cylindrical body portion, wherein the splines define a plurality of channels between adjacent splines;
wherein at least one of the splines is integrally formed on the surface of the driven end portion of the cassette driver; and
wherein the at least one spline includes a drive side, the drive side including a reinforcement engagement member.

14. The hub assembly of claim 13, further comprising a hub body including an annular internal cavity that extends from a first end of the hub body to a second end of the hub body, wherein the plurality of coaxial cylindrical surfaces of the driven end portion of the cassette driver are positioned within the annular internal cavity of the hub body.

15. The hub assembly of claim 14, further comprising a plurality of sprags located between the annular internal cavity of the hub body and drive end portion of the cassette driver.

16. The hub assembly of claim 13, further comprising a plurality of reinforcement members engaged with the reinforcement engagement member of the cassette driver.

17. The hub assembly of claim 13, further comprising:
a one-piece hub body defining a longitudinal rotational axis, the hub body including an internal cavity that extends from a first end of the hub body to an opposed second end of the hub body, the hub body including a first radially extending spoke support flange located at the first end of the hub body and a second radially extending spoke support flange located at the second end of the hub body;
an axle including a first end portion and a second end portion, the axle extending through the internal cavity of the hub body in a coaxial arrangement;
a first bearing set located at the first end portion of the axle configured to interface between the axle and the hub body to facilitate relative rotation between the axle and the hub body;
wherein the cassette driver includes a longitudinal rotational axis arranged coaxially with the longitudinal rotational axis of the hub body, the cassette driver including an internal cavity that extends from a drive end to an opposed driven end, wherein the drive end includes:
an annular opening positioned within the hub body between the first and second radially extending spoke support flanges, the second end portion of the axle extending through the annular opening;
a first external cylindrical surface located at a first diameter from the longitudinal rotational axis of the cassette driver;
a second external cylindrical surface located at a second diameter from the longitudinal rotational axis of the cassette driver, the second diameter being larger than the first diameter, the second external cylindrical surface being closer to the driven end of the cassette driver than the first external cylindrical surface; and
a third external cylindrical surface located at a third diameter from the longitudinal rotational axis of the cassette driver, the third diameter being larger than the second diameter, the third external cylindrical surface being closer to the driven end than the second external cylindrical surface;

a second bearing set located at the second end portion of the axle, the second bearing set configured to interface between the axle and the internal cavity of the cassette driver to facilitate relative rotation between the axle and the cassette driver;

a third bearing set located between the first external cylindrical surface of the driven end of the cassette driver and the internal cavity of the hub body to facilitate relative rotation between the cassette driver and the hub body;

a fourth bearing set located between the third external cylindrical surface of the driven end of the cassette driver and the internal cavity of the hub body configured to facilitate relative rotation between the cassette driver and the hub body;

a sprag sleeve pressed into the hub body in radial alignment with a portion of the second external cylindrical surface of the driven end of the cassette driver, wherein the sprag sleeve has an internal surface that is harder than the surface of the internal cavity of the hub body; and an annular sprag retaining cage having a plurality of sprags that are tension biased against the second external cylindrical surface of the driven end of the cassette driver and radially aligned with the sprag sleeve.

18. A cassette driver comprising:

a cylindrical body portion;

a plurality of axially extending raised splines spaced apart on the cylindrical body portion;

wherein at least one of the splines is integrally formed on the surface of the driven end portion of the cassette driver, wherein the at least one spline includes a drive side, the drive side including a reinforcement engagement member, and wherein the distance from a rotational axis to a far edge of the reinforcement member does not exceed the distance from the rotational axis to a top surface of the at least one spline.

19. The cassette driver of claim 18, further comprising a reinforcement member being constructed of a material that has a hardness that is greater than a hardness of the cassette driver, the reinforcement member engaged with the reinforcement engagement member, wherein adjacent splines define a channel therebetween, and wherein the reinforcement member is at least partially recessed into the channel.

* * * * *